United States Patent Office 3,644,495
Patented Feb. 22, 1972

3,644,495
PRODUCTION OF HALOGENATED ESTERS AND UNSATURATED ESTERS
Paul R. Stapp, Bartlesville, Okla., assignor to Phillips Petroleum Company
No Drawing. Filed Dec. 31, 1969, Ser. No. 889,750
Int. Cl. C07c 67/00; C07d 7/04
U.S. Cl. 260—491                                     11 Claims

ABSTRACT OF THE DISCLOSURE

Alkenyl alkanoates and 3-haloalkyl alkanoates are produced by reacting 1-alkenes, hydrogen halides, paraformaldehyde, and nitriles at temperatures in the range of −80 to 0° C. Cycloalkenylmethyl alkanoates and 2-halocycloalkylmethyl alkanoates are produced by reacting cycloalkenes, hydrogen halides, paraformaldehyde, and nitriles at temperatures in the range of −80 to 0° C.

---

This invention relates to a process for the production of esters.

The esters that can be produced according to the process of this invention are known in the art. For example, 3-butenyl acetate is disclosed in The Journal of Polymer Science, vol. 4, pages 2617–2636 (1966), at page 2635.

It now has been found that these esters can be produced by reacting olefins, hydrogen halides, paraformaldehyde and nitriles at temperatures in the range of −80 to 0° C.

Accordingly, it is an object of this invention to provide a process for the production of esters.

Other objects, aspects and advantages of this invention will become apparent to one skilled in the art upon consideration of the following disclosure and appended claims.

The conversion of this invention can be represented by the following: R—CH$_2$—CH=CH$_2$+paraformaldehyde+R'—CN+HX→R—CH=CH—CH$_2$—

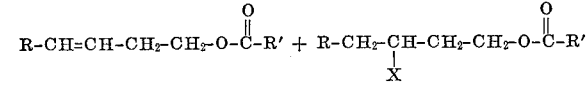

and

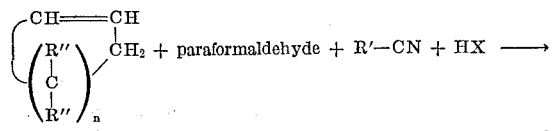

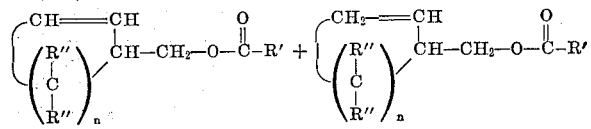

wherein R is hydrogen or aryl, cycloalkyl, or combinations thereof such as cycloalkylalkyl or alkylcycloalkyl having 1 to 10 carbon atoms per R group, wherein R' is alkyl having 1 to 6 carbon atoms per alkyl group, wherein X is a halogen such as fluorine, chlorine, bromine, or iodine, wherein R'' is hydrogen or alkyl having 1 to 4 carbon atoms per alkyl group and having up to 8 carbon atoms in all alkyl groups per molecule, and wherein $n$ is an integer in the range of 1 to 11.

Specific examples of olefins that can be employed in the process of this invention are propene, 1-hexene, 1-tridecene, 3-cyclopentylpropane, 3-cyclodecylpropene, 3-(2-methylcyclopentyl)propene, 3-(2-pentylcyclopentyl)propene, 8-cyclopentyl-1-octene, 4-cyclononyl-1-butene, 4,5-dimethyl-1-octene, 6,6-dimethyl-1-nonene, cyclohexene, cyclobutene, cyclotetradecene, cyclooctene, cyclodecene, 3,4,5,6,7,8,9,10-octamethylcyclotetradecene, 3,3-dimethyl-6,6-diethylcyclododecene, 6-propylcyclododecene, 5-(2-methylpropyl) cyclododecene, and the like, and mixtures thereof.

Specific examples of the hydrogen halides that can be employed in this invention are hydrogen iodide, hydrogen chloride, hydrogen fluoride, and hydrogen bromide. Specific examples of nitriles that can be employed in this invention are acetonitrile, heptanenitrile, propanenitrile, butanenitrile, 3-methylhexanenitrile, 2-ethylpentanenitrile, 3,3-dimethylpentanenitrile, and the like, and mixtures thereof.

Specific examples of esters that can be produced by the process of this invention are 3-butenyl acetate,
3-heptenyl acetate,
3-pentenyl acetate,
3-tetradecenyl heptanoate,
3-cyclopentyl-3-butenyl 3-methylhexanoate,
4-cyclododecyl-3-butenyl 2-ethylpentanoate,
9-cyclopentyl-3-nonenyl 3,3-dimethylpentanoate,
5-cyclononyl-3-pentenyl hexanoate,
5-cyclopentyl-3-pentenyl pentanoate,
4-(2-methylcyclopentyl)-3-butenyl octanoate,
4-(4-methylcyclononyl)-3-butenyl propanoate,
4-(2-pentylcyclopentyl)-3-butenyl heptanoate,
3-chlorobutyl acetate,
3-bromoheptyl acetate,
3-fluoropentyl acetate,
3-iododecyl heptanoate,
3-chloro-4-cyclopentylbutyl 3-methylhexanoate,
4-cyclodecyl-3-iodobutyl 2-ethylpentanoate,
9-cyclopentyl-3-fluorononyl 3,3-dimethylpentanoate,
3-bromo-5-cyclononylpentyl hexanoate,
3-bromo-5-cyclopentyl pentanoate,
3-chloro-4-(2-methylcyclopentyl)butyl octanoate,
3-bromo-4-(4-methylcyclononyl)butyl propanoate,
3-bromo-4-(2-pentylcyclopentyl)butyl heptanoate,
2-cyclohexenylmethyl acetate,
2-cyclobutenylmethyl 3-methylhexanoate,
2-cyclotetradecenylmethyl heptanoate,
2-cyclooctenylmethyl 2-propylbutanoate,
2-cyclodecenylmethyl 3,3-dimethylpentanoate,
4,5,6,7,8,9,10,11-octamethyl-2-cyclotetradecenylmethyl acetate,
4,4-dimethyl-7,7-diethyl-2-cyclodecenyl propanoate,
6-propyl-2-cyclododecenylmethyl octanoate,
5-(2-methylpropyl)-2-cyclodecenylmethyl pentanoate,
2-chlorocyclohexylmethyl acetate,
2-fluorocyclobutylmethyl 3-methylhexanoate,
2-iodocyclotetradecyl heptanoate,
2-bromocyclooctylmethyl 2-ethylpentanoate,
2-fluorocyclodecylmethyl 3,3-dimethylpentanoate,
2-chloro-4,5,6,7,8,9,10,11-octamethylcyclotetradecylmethyl acetate,
2-chloro-4,4-dimethyl-6,6-diethylcyclodecylmethyl propanoate,
2-bromo-7-propylcyclododecylmethyl octanoate,
2-bromo-5-(2-methylpropyl)cyclodecylmethyl pentanoate, and the like, and mixtures thereof.

Generally, the reaction temperature is in the range of −80 to 0° C., preferably in the range of −70 to −30° C. Reaction times sufficient to carry out the desired degree of conversion are employed. Generally, the reaction time is in the range of 10 minutes to 48 hours. Normally, pressures in the range of 0.5 to 10 atmospheres are usually employed.

If desired, an imino halide hydrohalide can be formed from the nitrile and the hydrogen halide prior to reacting the imino halide hydrohalide with the olefin and the paraformaldehyde.

In general, the mole ratio of paraformaldehyde to olefin is in the range of 0.5:1 to 2:1. The mole ratio of nitrile to olefin also is in the range of 0.5:1 to 2:1. The mole ratio of hydrogen halide to olefin is in the range of 0.1:1 to 10:1.

A suitable diluent, if desired, can comprise as much as 95 weight percent of the liquid reaction mixture. Any diluent can be employed which is substantially completely nonreactive under the reaction environment. Examples of suitable diluents include chloroform, carbon tetrachloride, methylene chloride, ethylene chloride, trifluoromethane, chlorotrifluoromethane, hexane, cyclohexane, tetrahydrofuran, tetrahydropyran, diethyl ether, and the like, and mixtures thereof.

The alkenyl alkanoates prepared according to the process of this invention are known compositions. These unsaturated esters can be hydrogenated to straight-chain alkanoates which are useful as solvents, saponified to unsaturated alcohols, or pyrolyzed to the diolefins. Further, these alkanoates can be copolymerized with a thiocarbonylfluoride and then processed into a film that is both elastic and colorless, according to the process described on page 2635 of Journal of Polymer Science, volume 4 (1966).

The other esters produced according to the process of this invention are known in the art. For example, 3-chlorobutyl acetate is disclosed in Chem. Abstracts, vol. 53, column 2231h, 2-cyclohexenylmethyl acetate is disclosed in Chem. Abstracts, vol. 51, column 9504d, and 2-chlorocyclohexylmethyl acetate is disclosed in Chem. Abstracts, vol. 54, columns 20827a, and 24450g.

The advantages of this invention are further illustrated by the following examples. The reactants and proportions and other specific conditions are presented as being typical and should not be construed to limit the invention unduly.

EXAMPLE I

A stirred reactor was charged with 63 g. of 97 weight percent paraformaldehyde, 82 g. of dry acetonitrile, and 500 ml. of methylene chloride. The reactor was cooled to −65° C. and 125 g. of propene was condensed into the mixture. Dry hydrogen chloride was then passed into the mixture for four hours with stirring at −65° C. Upon warming to room temperature, the reaction mixture was stirred with 500 ml. of water. The organic layer was separated, washed with water, washed with saturated sodium carbonate solution, dried with magnesium sulfate and filtered. The volatile were stripped and the residue was distilled under reduced pressure. A total of 102 g. of a colorless material having a boiling point of 45–100° C. at 55 mm. Hg was recovered. Gas liquid chromatography of this material demonstrated it to contains 43.8 mole percent of butenyl acetate, 6.1 mole percent of 4-chlorotetrahydropyran, and 49.1 mole percent of 3-chlorobutyl acetate.

This example demonstrates the synthesis of alkenyl alkanoates and 3-haloalkyl alkanoates according to the process of the invention.

EXAMPLE II

A stirred reactor was charged with 123 g. of dry acetonitrile, 164 g. of cyclohexene, 63 g. of 97 weight percent paraformaldehyde, and 300 ml. of dry methylene chloride. The reactor was cooled to −65° C., and hydrogen chloride was passed into the mixture slowly for two hours with the temperature being maintained at −65° C. Upon warming to room temperature, the reaction mixture was purged with nitrogen, treated with 500 ml. of water and stirred. An organic layer was separated, washed with saturated sodium carbonate solution, dried with magnesium sulfate and filtered. The volatiles were stripped and residue was fractionated under reduced pressure. A fraction weighing 102.6 g. having a boiling point of 55–126° C. at 20 mm. Hg was recovered. Gas-liquid chromatography and nuclear magnetic residence analysis of that material determined that it was comprised of a 50/50 mole percent mixture of 2-cyclohexenylmethyl acetate and 2-chlorocyclohexylmethyl acetate.

This example demonstrates the production of cycloalkenylmethyl alkanoates and 2-halocycloalkylmethyl alkanoates according to the process of this invention.

EXAMPLE III

A stirred reactor was charged with 250 ml. of methylene chloride and 41 g. of acetonitrile. Upon cooling to −65° C., hydrogen chloride was passed into the mixture until saturated to convert the nitrile to the imino chloride hydrochloride. Then 125 ml. of 1-hexene and 31.5 g. of 97 weight percent paraformaldehyde were added. Hydrogen chloride was passed in until uptake of hydrogen chloride ceased in about 1½ hours. The reaction mixture was stirred for an additional hour at −65° C. Upon warming to room temperature, the reaction mixture was treated with 250 ml. of water. The organic layer of methylene chloride solution was separated and washed with water, washed with saturated sodium carbonate solution, dried with magnesium sulfate and filtered. The volatiles were stripped from the filtrate and the residue was distilled at reduced pressure. A total of 114.9 g. of material was obtained in a fraction having a boiling point of 37–130° C. at 20 mm. Hg. The sample was determined by gas-liquid chromatography to contain 55 mole percent of 3-heptenyl acetate which was equivalent to 63.3 g. of 3-heptenyl acetate or a 40.6 mole percent yield based on the 1-hexene or paraformaldehyde charged.

This example demonstrates the process of this invention wherein the imino chloride hydrochloride is formed prior to the reaction with the olefin and paraformaldehyde.

Although this invention has been explained in considerable detail, it must be understood that such detail is for the purpose of illustration only and that many variations and modifications can be made by one skilled in the art without departing from the scope and the spirit thereof.

I claim:

1. A process for the production of esters comprising reacting (a) an olefin represented by the formula

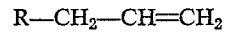

or

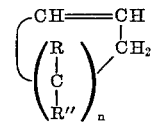

wherein R is hydrogen or alkyl, cycloalkyl or combinations thereof having 1 to 10 carbon atoms per R group, R″ is hydrogen or alkyl having 1 to 4 carbon atoms per alkyl group and having up to and including 8 carbon atoms in all alkyl groups per molecule and n is an integer in the range of 1 to 11, (b) paraformaldehyde, (c) a hydrogen halide and (d) a nitrile represented by the formula R′—CN wherein R′ is alkyl having 1 to 6 carbon atoms per alkyl group at a temperature in the range of −80 to 0° C.

2. A process according to claim 1 wherein said reacting is carried out at a temperature in the range of −70 to −30° C., a pressure in the range of 0.5 to 10 atmospheres and a reaction time in the range of 10 minutes to 48 hours.

3. A process according to claim 1 wherein the mole ratio of paraformaldehyde to olefin is in the range of 0.5:1 to 2:1, the mole ratio nitrile to olefin is in the range of 0.5:1 to 2:1 and the mole ratio of hydrogen halide to olefin is in the range of 0.1:1 to 10:1.

4. A process according to claim 1 wherein said reacting is carried out in the presence of a substantially completely non-reactive diluent comprising up to 95 percent of the resulting reaction mixture.

5. A process according to claim 4 wherein said diluent is methylene chloride.

6. A process according to claim 1 wherein said nitrile is acetonitrile and said hydrogen halide is hydrogen chloride.

7. A process according to claim 1 wherein said olefin is propene, cyclohexene or 1-hexene.

8. A process according to claim 1 wherein said esters are represented by the formulas

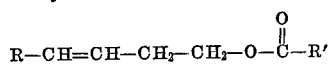

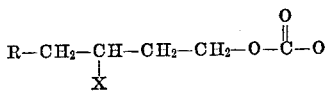

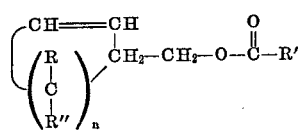

or

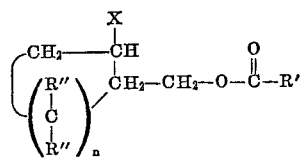

wherein R, R' and R'' are defined in claim 1 and X is a halogen.

9. A process according to claim 1 wherein said esters are butenyl acetate, 3-chlorobutyl acetate, 2-cyclohexenylmethyl acetate, 2-chlorocyclohexylmethyl acetate or 3-heptenyl acetate.

10. A process according to claim 1 wherein said nitrile and said hydrogen halide are admixed prior said reacting with one olefin and paraformaldehyde to form an imino halide hydrohalide.

11. A process according to claim 10 wherein said imino halide hydrohalide is imino chloride hydrochloride.

References Cited

UNITED STATES PATENTS

| | | | |
|---|---|---|---|
| 2,578,647 | 12/1951 | Stiteler | 260—491 |
| 3,030,384 | 4/1962 | Somerville | 260—345.1 |
| 3,239,553 | 3/1966 | Rust | 260—345.1 |

LORRAINE A. WEINBERGER, Primary Examiner

V. GARNER, Assistant Examiner

U.S. Cl. X.R.

260—345.1, 408, 410

UNITED STATES PATENT OFFICE

CERTIFICATE OF CORRECTION

Patent No. 3,644,495       Paul R. Stapp       Dated: February 22, 1972

It is certified that error appears in the above-identified patent and that said Letters Patent are hereby corrected as shown below:

Column 4, line 48, claim 1, the formula 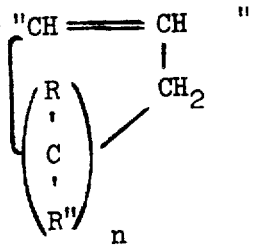

should read 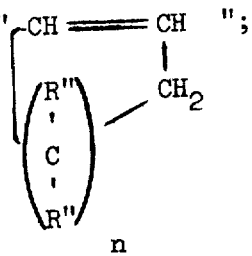;

column 5, claim 8, line 16, the formula "R-$CH_2$-$\overset{O}{\underset{X}{C}}$H-$CH_2$-$CH_2$-O-$\overset{O}{\underset{}{C}}$-O" should read R-$CH_2$-$\overset{}{\underset{X}{C}}$H-$CH_2$-$CH_2$-O-$\overset{O}{\underset{}{C}}$-R'"; column 6, claim 10, line 9, "one" should be --- the ---.

Signed and sealed this 18th day of July 1972.

(SEAL)
Attest:

EDWARD M. FLETCHER, JR.
Attesting Officer

ROBERT GOTTSCHALK
Commissioner of Patents